Oct. 28, 1952 E. C. BAISEL 2,615,467
SILENT CLOSING PILOT-OPERATED VALVE
Filed Feb. 26, 1948
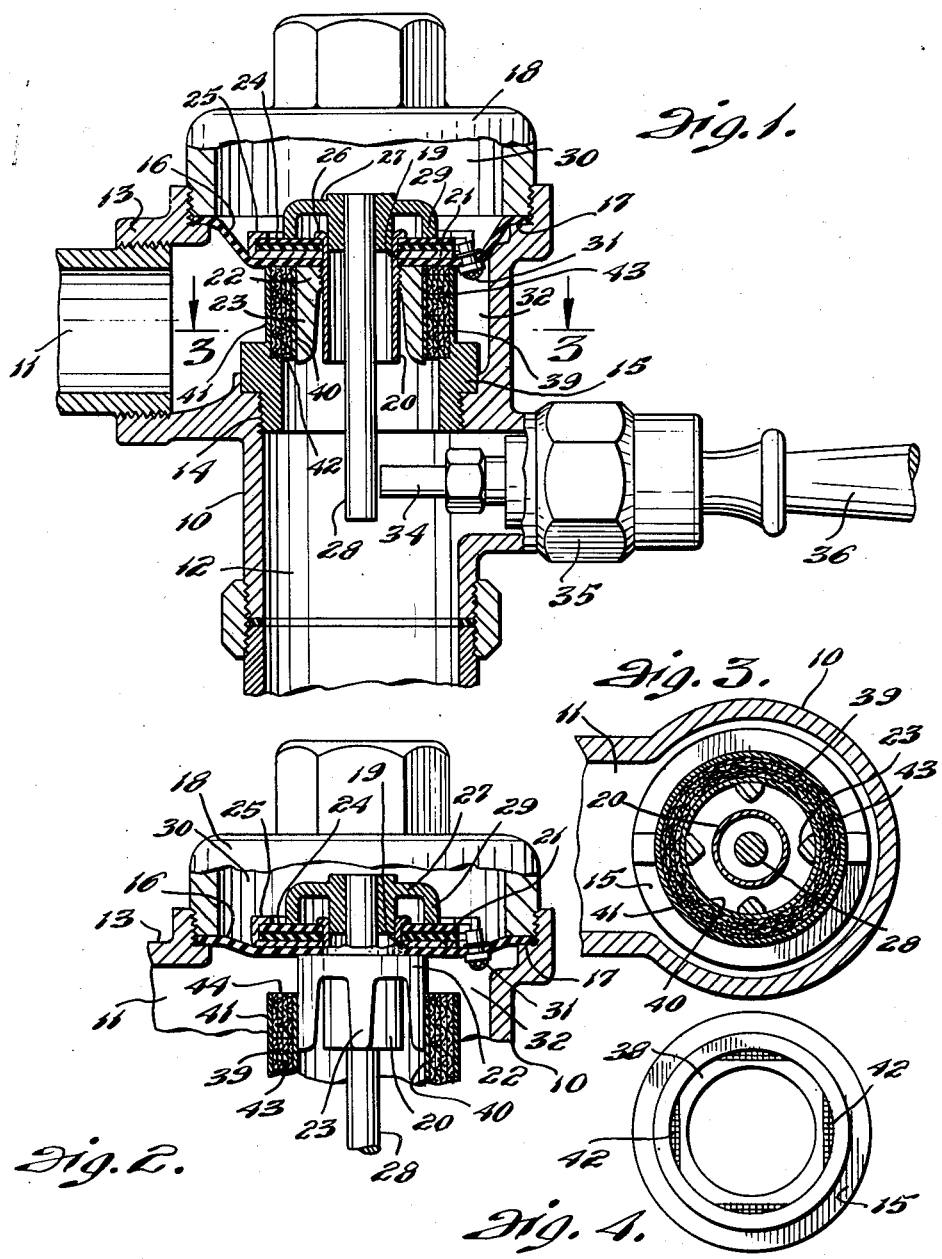
INVENTOR.
EDWIN C. BAISEL
BY
Clark & Ott
ATTORNEYS Patented Oct. 28, 1952

2,615,467

UNITED STATES PATENT OFFICE 2,615,467

SILENT CLOSING PILOT-OPERATED VALVE

Edwin C. Baisel, New York, N. Y., assignor to Delany Realty Corporation, New York, N. Y., a corporation of New York Application February 26, 1948, Serial No. 10,969

3 Claims. (Cl. 137—628)

1

This invention relates to valves and is more particularly concerned with valves for controlling the flow of fluid therethrough.

The invention has in view the provision of a valve structure for effectively silencing the flow of fluid through the valve during the closing movement of the valve element.

Another object of the invention is the provision of a flush valve of the diaphragm type which reduces and limits the high pressure flow of water during the closing movement of the valve element.

Still another object of the invention is the provision of a flush valve of said character in which the flow of refill water through the passageway in the valve seat is shut off after partial movement of the valve toward closed relation and the flow thereafter continued through a restricted passageway so as to diminish the velocity and pressure of the fluid during the remainder of the closing movement of the valve element.

With the foregoing and other objects in view, reference is now made to the following specification and accompanying drawings in which the preferred embodiment of the invention is illustrated.

In the drawings:

Fig. 1 is a vertical sectional view through a flush valve with parts shown in full and illustrating the valve provided with an auxiliary restricted passageway for reducing the velocity and pressure of the fluid during the closing movements of the valve element.

Fig. 2 is a similar view showing a fragmentary portion of the valve illustrated in Fig. 1 and with the valve element moved to open relation.

Fig. 3 is a horizontal sectional view taken approximately on line 3—3 of Fig. 1.

Fig. 4 is a bottom plan view of the sleeve member.

Referring to the drawings by characters of reference, the invention is shown in its application to a flush valve. It is to be understood, however, that the construction for reducing the velocity and pressure of the fluid so as to silence the flow of the fluid during the closing movement of the valve element is applicable to all valves having movable valve elements for closing off the flow of fluid through the valve. In the embodiment illustrated, the flush valve includes a casing 10 having inlet and outlet openings 11 and 12, the inlet 11 communicating with the interior of the casing through a lateral boss 13. Intermediate the inlet and outlet openings 11 and 12 the casing 10 is formed with a threaded opening 14 in which a tubular sleeve 15 is

2 removably arranged and extends upwardly therefrom with the upper open end thereof disposed adjacent the upper end of the casing and defines a valve seat.

A flexible diaphragm valve member 16 is mounted within the casing above the tubular sleeve 15 and has its marginal edge secured against the internal shoulder 17 at the upper end of the casing by a removable cap 18. The diaphragm member 16 is formed with a central opening 19 in which an outlet tube or bushing 20 is fitted and sealed to depend therefrom and extend into the tubular sleeve 15. The bushing 20 is secured at its upper end to a metallic head 21 disposed against the upper face of the diaphragm member 16, the bushing 20 and the head 21 being secured to the diaphragm member 16 by an annular retaining nut 22 having depending circumferentially spaced guide fingers 23 which slidably engage within the tubular sleeve 15 for guiding the diaphragm member 16 in its movement toward and away from closing relation with the tubular sleeve 15. The retaining nut 22 functions to close the passageway to the flow of water through the central opening in the tubular sleeve 15 on the closing movement of the diaphragm member 16 before the diaphragm engages its seat. This takes place when the upper end of the retaining nut 22 enters the upper end of the tubular sleeve 15. The head 21 is provided with an annular valve seat 24 consisting of one or more layers of resilient material such as rubber composition which seat is secured in position on the upper surface of the head 21 by the inturned peripheral rim 25 thereof and the expanded upper end 26 of the bushing 20. A valve element 27 having a depending actuating stem 28 protruding through the bushing 20 is provided with a depending annular rim 29 adapted to engage the seat 24 to close the passageway through the bushing 20 so as to shut off the flow of water from the upper chamber 30.

The diaphragm member 16 is provided with the usual by-pass fitting 31 opening therethrough for permitting of the flow of fluid from the water chamber 32 to the upper chamber 30 so as to equalize the pressure therein with the pressure in the chamber 32 to thereby flex the diaphragm member 16 downwardly into seating engagement with the upper end of the tubular sleeve 15.

In this type of fluid valve, the actuator stem 28 is disposed adjacent to the inner end of an actuator rod 34 mounted in a water-tight connection 35 and is engaged at its outer end by a handle 36 having swinging movement for imparting inward reciprocatory movement to the rod 34 into engagement with the stem 28 so as to tilt or rock the valve element 27 on its seat 24 to thereby permit of the flow of water from the chamber 30 through the bushing 20. This reduces the pressure in the chamber 30 whereby the pressure in the chamber 32 will lift the diaphragm member 16 from its seat so that the water will flow from the inlet 11 through the tubular sleeve 15 and through the outlet 12.

In order to limit the velocity and pressure of the water flowing through the valve during the closing movement of the diaphragm member 16, the tubular sleeve 15 is formed with an upper portion of reduced internal diameter extending upwardly from the internal shoulder 38 and said upper portion is formed with an annular recess 39 located between concentric walls 40 and 41. The recess 39 opens through the upper end of the tubular sleeve 15 and communicates with the interior of said sleeve by circumferentially spaced apertures 42 in the shoulder 38. The recess 39 is provided with a series of convolutions or layers of wire screen or mesh 43 which are arranged with adjacent convolutions or layers disposed in engagement and with the several convolutions or layers snugly fitting between the concentric walls 40 and 41. The upper edges of the concentric walls 40 and 41 together define a seat 44 against which the diaphragm member 16 is adapted to engage to close off the flow of the water from the inlet 11. The annular recess 39 provides an auxiliary passageway for the flow of the water when the main flow through the central passageway in the tubular sleeve 15 is closed by the upper end of the nut 22. When this takes place the diaphragm member 16 is still in spaced relation from its seat 44 to permit of the flow of the water through the annular recess 39 and thence through the apertures 42. The restricted area of the annular recess 39 and the apertures 42 reduces the pressure and velocity of the water while the several layers of wire screen or mesh 43 in the recess 39 retards the flow of the water. This reduction of velocity and pressure and the retarding of the flow of the water through the auxiliary passageway defined by the recess 39 allow the diaphragm member 16 to close or engage its seat 44 without the emission of objectionable noise in the flow of the water.

What is claimed is:

1. In a valve, a valve casing having inlet and outlet openings, an annular wall located within said casing intermediate the inlet and outlet openings and defining a main passageway for the flow of fluid therethrough, said annular wall having spaced concentric wall portions providing concentric seats at the upper end thereof, a closure member located within said casing and movable toward and away from said seats and into engagement therewith for closing off the flow of fluid through the valve, said closure member having an annular element connected therewith and adapted to slidably fit in said main passageway for shutting off the flow therethrough prior to the seating of the closure member on said annular seats and said annular wall having a continuous recess opening between the lower end thereof and through said annular seats to thereby provide an auxiliary passageway for the flow of fluid through the valve during the closing movement of the closure member when said annular element closes off the flow through the main passageway prior to the seating of the valve element, and layers of foraminous material arranged in said recess for retarding the flow of the fluid through said auxiliary passageway.

2. In a valve, a valve casing having inlet and outlet openings, an annular wall located within said casing intermediate the inlet and outlet openings and defining a main passageway for the flow of fluid therethrough, said annular wall forming an annular seat at the upper end thereof, a closure member located within said casing and movable toward and away from said seat and into engagement therewith for closing off the flow of fluid through the valve, said closure member having an annular element connected therewith and adapted to slidably fit in said main passageway for shutting off the flow therethrough prior to the seating of the closure member on said annular seat and said annular wall having a continuous recess opening through the lower end thereof and through said annular seat to thereby provide an auxiliary passageway for the flow of fluid through the valve during the closing movement of the closure member when said annular element closes off the flow through the main passageway prior to the seating of the valve element, and layers of foraminous material arranged in said recess for retarding the flow of the fluid through said auxiliary passageway with the upper ends of said layers disposed adjacent the seat and the apertures through the foraminous material extending at right angles to the length of said auxiliary passageway.

3. In a valve, a valve casing having inlet and outlet openings, an annular wall located within said casing intermediate the inlet and outlet openings and defining a main opening for the flow of fluid therethrough, said annular wall having a recess extending continuously about the same so as to provide inner and outer concentric wall portions with the recess located therebetween and opening through the upper end thereof and communicating at its lower end with the lower portion of the casing, the upper edges of said concentric wall portions together providing a valve seat, a closure member located within said casing and movable toward and away from said seat and into engagement therewith for closing off the flow of fluid through the valve, said closure member having an annular element slidably fitted in said main opening for shutting off the flow therethrough prior to the seating of the closure member on said valve seat, and said recess in said annular wall providing an auxiliary passageway for the flow of fluid through the valve during the closing movement of the closure member when said annular element closes off the flow through the main opening prior to the seating of the valve element, and foraminous material arranged in said recess for retarding the flow of fluid through said auxiliary passageway.

EDWIN C. BAISEL.

REFERENCES CITED

The following references are of record in the file of this patent:

UNITED STATES PATENTS

| Number | Name | Date |
|---|---|---|
| 56,709 | Clark | July 31, 1866 |
| 2,012,255 | Binnall | Aug. 20, 1935 |
| 2,216,092 | Northon | Sept. 24, 1940 |
| 2,271,047 | Sloan | Jan. 27, 1942 |